Patented May 16, 1933

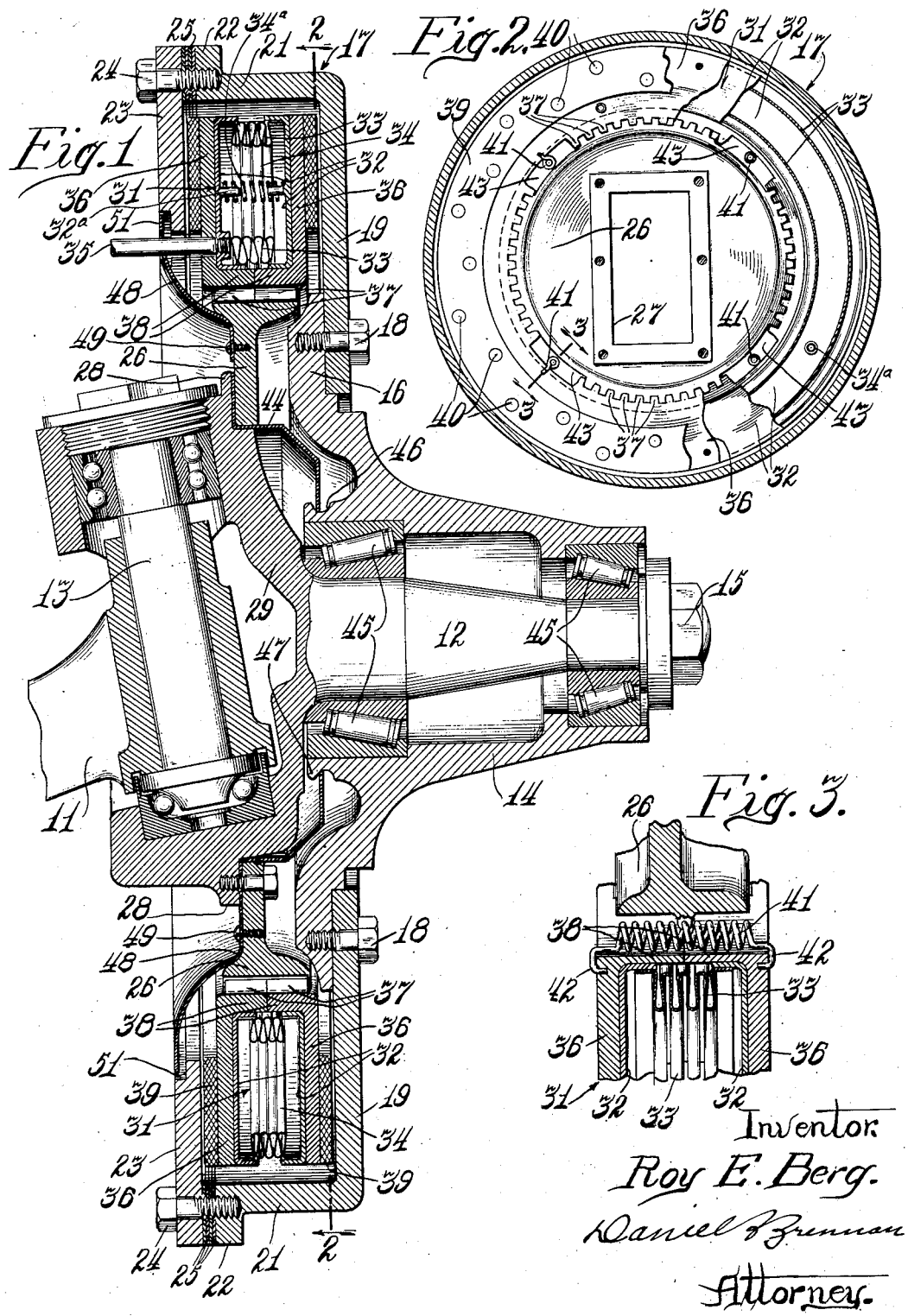

1,909,744

UNITED STATES PATENT OFFICE

ROY E. BERG, OF CHICAGO, ILLINOIS

BRAKE

Application filed August 3, 1929. Serial No. 383,357.

The invention relates to improvements in braking mechanism and particularly to a novel fluid pressure actuated brake adaptable for use on vehicles or the like.

It is one of the objects of the invention to provide an improved fluid pressure actuated braking mechanism which is positive in operation, and which may be actuated with a minimum amount of liquid pressure.

A further object of the invention resides in the provision of an improved brake structure, which is more economically manufactured and assembled than the devices of the prior art, which is positive in its action, and which is capable of effective operation at a low operating pressure, which is a small fraction of the operating pressures required in the hydraulic brakes of the prior art.

A still further object of the invention is the provision of an improved hydraulic brake structure, having an expansible pressure actuated member of large pressure area, which is capable of giving long and efficient service without the necessity for repair, and which is quick and positive both in its braking action and in the cessation of the braking action when pressure is released from the brake pedal or other controlling device.

The foregoing and such other objects of the invention as will appear hereinafter as the description proceeds, will be more readily understood from a perusal of the following specification, reference being had to the accompanying drawing, in which:

Fig. 1 is a view in partial section, taken on a vertical plane lying in the axis of the front wheel of a vehicle, equipped with a brake mechanism according to the invention.

Fig. 2 is a sectional view, taken substantially on the plane of the line 2—2 of Fig. 1.

Fig. 3 is an enlarged detail sectional view taken on the plane of the line 3—3 of Fig. 2.

Referring to the drawing, the embodiment, which has been chosen to illustrate the novel braking mechanism, is shown applied to the front wheel structure of a vehicle having the customary front axle 11. A non-rotatable spindle 12 is pivotally mounted on the end of axle 11 by a substantially vertically disposed king bolt 13. The hub 14 of the front wheel is rotatably mounted on spindle 12 and held against displacement by nut 15 and associated parts. A brake casing 17 is rigidly secured to the annular flange 16 of the rotatable hub 14 by cap screws 18, said casing preferably comprising a front wall 19, and an outer wall 21 extending rearwardly at right angles to the front wall 19, and the rear wall 23. The outer wall 21 may be provided with a reinforcing and securing flange 22 at its outer edge, and the rear wall 23 may consist of an annular member secured to the flange 22 by bolts 24, adjacent its outer periphery. It is preferable that a plurality of shims 25 be interposed between the annulus 23 and the flange 22 whereby the distance between the inside face of said annulus and the inside face of the front wall 19 of the brake casing may be adjusted.

It will thus be observed that the foregoing structure forms a casing for the brake mechanism, which casing is provided with front and rear walls adapted to be used as frictional surfaces for engagement with the shoes of the brake mechanism, and the entire casing may be mounted upon the wheel or other rotatable part, while the brake shoes, pressure element, and mechanism, all to be described in detail herein, may be mounted upon a fixed element so as to be conveniently connected with a master cylinder with a hose or conduit 35.

A ring gear 26, having a centrally located non-circular opening 27, is rigidly secured to a shoulder 28 provided on the enlarged body portion 29 of the non-rotatable spindle 12. The ring gear 26 is disposed in a plane substantially midway between the plane of the opposed faces of the front wall 19 and the rear wall 23 of the brake casing 17.

Mounted in the annular recess formed by the annulus 23 and front wall 19 of the brake casing is a semi-floating expansible member 31. This expansible member is preferably formed of a pair of oppositely disposed rings 32, preferably of substantially channel shape in cross-section, and joined together at their inner and outer edges by extensible walls 33. The extensible walls 33 are preferably corrugated to permit ready expansion or contraction of the hermetically sealed annular chamber 34, formed thereby. A fluid pressure inlet line 35 communicated with the expansible chamber 34, through which fluid pressure is admitted into or withdrawn from said chamber upon operation of the usual foot pedal acting on a master piston (not shown). Mounted on adjacent sides of the expansible chamber are annular brake shoes 36 having gear teeth 37 formed on their inner edge.

The teeth 37 formed on the brake shoes are adapted to mesh with the teeth of the fixed ring gear 26, to slidably mount the brake shoes on said fixed gear. The outwardly disposed faces of the brake shoes 36 are each provided with suitable brake lining of woven or moulded frictional material 39, preferably secured thereto by countersunk rivets 40. A plurality of compression springs 34a are provided between the rings 32 to maintain the expansible element in continuous engagement with the brake shoes. Studs 32a are provided on the inner face of the rings 32 to prevent displacement of said springs.

Contraction of the expandible member 31 is aided by providing a plurality of coil springs 41, normally under tension, having their ends 42 anchored in the brake shoes 36, and which are preferably evenly spaced around the inner edge of the expansible member. To permit said springs to be mounted therein, portions of the teeth on the ring gear 26 and the adjacent teeth on the brake shoes 36 are cut away, as shown at 43 in Fig. 2. The springs 41 are preferably attached to the gear 26 at the middle of the spring to maintain the brake shoes in middle position and prevent dragging of either shoe.

Upon admission of fluid under pressure into the expansible chamber 34, through the admission line 35, said chamber is expanded, moving the frictional material 39, on the brake shoes 36, into frictional engagement with the inner face of the front wall 19 of the brake casing and the rear wall 23. As the expansible element is held against rotation by the fixed ring gear 26, rotation of the brake casing 17 is retarded. When the fluid pressure within the expansible chamber 34 is reduced, said chamber contracts and the brake casing is again free to rotate.

The provision of the semi-floating expansible chamber 34 for effectively retarding rotation of the rotatable casing 17 reduces the amount of initial pressure required for operation, as the area of the expansible member is much greater than the area of the master piston operated by the foot pedal or other control. The ratio of these areas is approximately 100 to 1 and the customary methods give a ratio of approximately 1 to 1½. The friction material 39 is not subjected to being wrapped about a brake drum as in the usual vehicle wheel braking mechanisms thus its serviceable life is greatly extended and the pressure is uniformly distributed over entire friction area. As the friction material wears down, from extensive service, the brake may be adjusted by removing one or more of the shims 25 to reduce the distance between inner faces of the front and rear walls of the brake casing 17.

A suitable dirt guard 44 is provided on the inside of the ring gear 26 to prevent foreign matter, such as, road dust and particles of the brake lining, from entering into and damaging the bearings 45 of the hub 14. The guard 44 also serves to prevent grease from the bearings from working outwardly onto the frictional surfaces. The free edge of the guard 44 engages in an annular groove 46 located adjacent the edge of the inwardly projecting portion 47 of the hub 14. The ring gear 26 also carries a dust guard or shield 48 on its outer side, said shield being secured thereto by screws 49. The body portion of the shield 48 flares outwardly and its circumferential edge overlie the inner recessed edge 51 of the rear wall 23 of the brake casing.

The expansible member 31 may be removed for repairs, or relining, by removing the dust guard 48 and annulus 23. With these two members removed and the fluid pressure inlet line 35 disconnected, the semi-floating expansible member 31 may readily be withdrawn from the brake drum 17. Relining of the braking shoes will not be required, however, until the lining material 39 has been worn almost entirely away, as the expansible element, being semi-floating, automatically adjusts itself to apply an equal pressure on both frictional surfaces.

From the foregoing it will be understood that a very efficient braking mechanism is provided wherein the amount of pressure applied in proportion to the ratio of areas of the master piston, operated by the foot pedal, to the annular expansible member is so large that intensity of the operating pressure may be materially reduced. In fact tests have shown that an intensity of pressure of twenty-five pounds per square inch is sufficient to slide all wheels of a vehicle. The life of the brake is increased due to the large area over which the frictional pressure is applied, as the various parts thereof and the lining material are not subjected to excessive strain or wear.

While the invention has been shown and described in detail, it is to be understood that it is capable of embodying various modifications without departing from the spirit of the invention or the scope of the appended claims.

I claim:

1. In a hydraulic brake, the combination of a fixed member with a rotatable member carried thereby, a brake casing carried by said rotatable member having a pair of opposed walls forming frictional braking surfaces, a gear carried by said fixed member medially between the opposed walls of said casing, a pair of annular brake shoes having frictional material on their outer faces, each provided with internal teeth complementary to the teeth of said gear, and being slidably mounted thereon, an expansible element for forcing said annular brake shoes into engagement with the walls of said casing, and means on said ring gear for protecting said expansible element from injury.

2. In a hydraulic brake, the combination of a fixed member with a rotatable member carried thereby, a brake casing carried by said rotatable member having a pair of opposed walls forming frictional braking surfaces, a gear carried by said fixed member medially between the opposed walls of said casing, a pair of annular brake shoes having frictional material on their outer faces, each provided with internal teeth complementary to the teeth of said gear, and being slidably mounted thereon, an expansible element for forcing said annular brake shoes into engagement with the walls of said casing, and shields carried on the fixed member for protecting the rotatable member.

3. An article of the class described, having in combination, a rotatable brake casing comprising spaced front and rear walls, an expansible member mounted between said front and rear walls, said expansible member comprising a pair of spaced channel-shaped rings connected on their edges by corrugated extensible walls, an annular flanged brake shoe having teeth on its inner edge mounted on each side of said expansible member, a fixed ring gear having its teeth meshing with the teeth on said pressure plates, whereby the latter are held against rotation, said expansible member being adapted to urge the brake shoes into frictional engagement with said rotatable brake casing, and protecting means for said brake shoes carried on said ring gear.

4. An article of the class described, having in combination, a rotatable brake casing comprising a front and rear wall, an expansible member comprising an annular hermetically sealed expansible chamber, a pair of annular brake shoes having a common axis arranged one on each side of said expansible member, said brake shoes having a flange on their inner edge, teeth on said flanges, a ring gear mounted on a fixed shoulder, the teeth on said ring gear meshing with the teeth on said brake shoes to hold the latter against rotation, said brake shoes being capable of moving longitudinally on their common axis away from each other upon admission of fluid pressure into the expansible chamber, whereby a frictional contact is effected between said brake shoes and the rotatable brake casing to retard the rotation of the latter, and means on said ring gear co-operating with said casing to protect said brake shoes.

In testimony whereof I affix my signature at Akron, Ohio.

ROY E. BERG.